UNITED STATES PATENT OFFICE.

GEORGE H. HERON, OF WASHINGTON, DISTRICT OF COLUMBIA, ASSIGNOR, BY MESNE ASSIGNMENTS, TO EDWIN P. FOWLER.

IMPROVEMENT IN PREPARING FISH FOR FOOD.

Specification forming part of Letters Patent No. 70,435, dated November 5, 1867; reissue No. 4,714, dated January 16, 1872.

*To all whom it may concern:*

Be it known that I, GEORGE H. HERON, of the city and county of Washington, in the District of Columbia, have invented a new and Improved Process for Treating Fish for Food; and I do hereby declare the following to be a clear, full, and exact description of the same, sufficient to enable others skilled in the art to which it appertains to fully understand and use the same.

The object of this invention is to soften and reduce the bones of fish in such a manner that they may be freely masticated and swallowed and shall, when taken into the stomach, be readily digestible as a wholesome and nutritious article of food.

In preparing fish under my improved process they are cleansed externally and internally and scaled, and may or may not have the fins removed. I take a vessel made in any suitable form, and of any material which is salt-glazed or otherwise adapted for the purpose. Into this vessel salt is sprinkled and a layer of fish, including the bones and flesh, is placed. Upon this layer salt is sprinkled; then a few cloves and a small quantity of pure African or cayenne pepper; then another layer of fish, salt, &c. The vessel is thus packed until nearly filled, sufficient space being left for the addition of pure vinegar. The vessel is then closed and the whole subjected to the action of heat at a temperature of, say, about 170° Fahrenheit, the application of the heat being continued for twenty-four hours, more or less, according to the size of the bones.

The fish thus prepared are then packed in hermetically-sealed cans, and may be shipped to any part of the world as a commercial article of food.

The salt, pepper, and cloves have their ordinary functions of utility; but the process may be successfully carried out without their aid, as the vinegar and heat are the only essential agencies. The acid of the vinegar has the effect to neutralize or dissolve the phosphate of lime contained in the bones. Hence the bones of the fish thus treated may be taken into the mouth with the flesh, and can be masticated and swallowed without the slightest inconvenience. The constituents of the bone are nutritious and wholesome when taken into the stomach.

I do not wish to be understood as confining myself to the particular details of the process as given herein, as it is obvious that the same may be varied considerably without departing from the essential principles of my invention.

Having thus fully set forth the nature of my invention, what I claim, and desire to secure by Letters Patent, is—

1. The method, substantially as herein set forth, of reducing or softening the bones of fish so as to form an article of food, as set forth.

2. I claim, as a new commercial article of food, fish having their bones reduced and softened, as herein set forth, and packed in hermetically-sealed cans for shipment.

GEO. H. HERON.

Witnesses:
T. H. ALEXANDER,
W. R. DRINKARD.

(58)